J. MATTHEWS.

Refrigerator.

No. 9,132. Reissued Mar. 30, 1880.

Witnesses:
John C. Tunbridge.
Willy G. C. Schultz.

Inventor:
John Matthews
by his attorney
A. v. Briesen

N. PETERS, PHOTO-LITHOGRAPHER, WASHINGTON, D. C.

UNITED STATES PATENT OFFICE.

JOHN MATTHEWS, OF NEW YORK, N. Y.

REFRIGERATOR.

SPECIFICATION forming part of Reissued Letters Patent No. 9,132, dated March 30, 1880.

Original No. 118,037, dated August 15, 1871. Application for reissue filed November 21, 1879.

*To all whom it may concern:*

Be it known that I, JOHN MATTHEWS, of the city, county, and State of New York, have invented a new and useful Improvement in Refrigerators, of which the following is a full, clear, and exact description, reference being had to the accompanying drawings, forming part of this specification, and in which—

Figure 1:
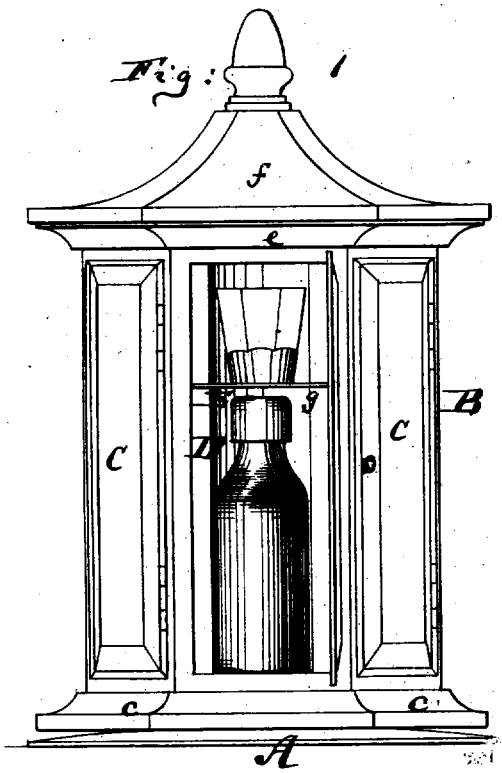
Figure 2:
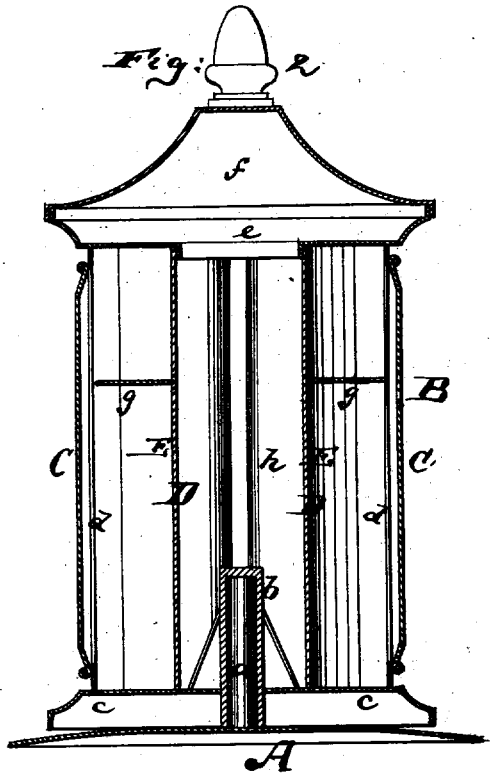
Figure 3:
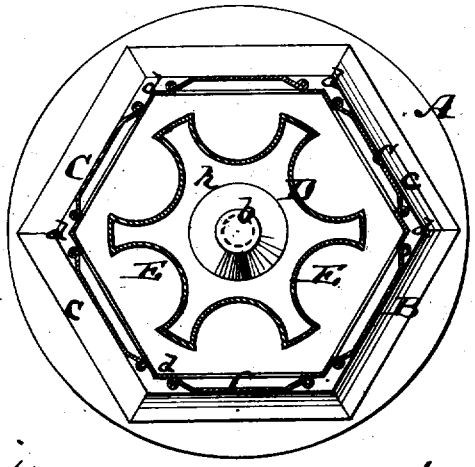

Figure 1 represents a view, in elevation, of a refrigerator constructed in accordance with my invention; Fig. 2, a central vertical section of the same, and Fig. 3 a transverse section thereof.

My improvement, while applicable to refrigerators for different purposes, is mainly designed to be used in connection with soda-water apparatus for keeping cool the sirup-bottles and tumblers thereof, or forming accessories thereto, and will here be described in such relation. It is, however, distinct in itself, and may be removed from place to place, as circumstances require.

Said refrigerator, as represented in the accompanying drawings, is constructed so as to enable a series of vertically-disposed compartments or recesses having suitable shelves to rotate on a vertical axis.

Referring to the accompanying drawings, A represents a supporting-stand, which may either be a fixture or be removable in common with the refrigerator B, and which is provided with an upwardly-projecting center pin or pivot, *a*, for the support of the refrigerator, with freedom to turn thereon, and preferably so that it can be lifted off the pin, as convenience may direct. To this end the refrigerator B is formed with a socket, *b*, arranged to project up into the ice-well, as shown in Fig. 2.

Said refrigerator may be made of sheet metal, consisting, so far as its outside shell is concerned, of a base, *c*, jambs *d*, and top *e*, with a cap or lid, *f*, fitting thereon, and with doors C C, hinged to the jambs so as to swing vertically when opening and closing the same.

It is preferable to construct the inclosure of the refrigerator of a many-sided figure corresponding with the number of doors arranged in it. The base *c* forms a lower shelf for the sirup-bottles, while an upper shelf, *g*, also exposed on opening the doors, serves to carry the tumblers. These shelves lie around and on the outside of a wall, D, which embraces a compartment or ice-well, *h*, for ice or frigorific mixture, said ice-well forming a hollow central chamber extending from top to bottom of the body of the refrigerator. The wall next to the shelves is indented or formed with recesses or niches E E, of half-round or concave shape, extending down the outside of the well, and corresponding in number and arrangement with the doors C C, which they face. This wall D constitutes a part of the revolving structure or refrigerator. The chamber *h*, inclosed by it, may be filled from the top with ice or frigorific mixture on taking off the cap *f* for the purpose. It is shaped, as described, to receive on its lower shelf, *c*, within the recesses E E, the sirup-bottles, and on the upper shelf, *g*, within said recesses, the tumblers intended to be used in connection with the apparatus, and so that the ice or refrigerating agent will embrace or encompass, through the intervening wall or walls of the well, the tumblers and sirup-bottles for about half their diameters, more or less, thereby keeping the same well cooled.

The facility with which the refrigerator may be turned on its pivot allows of any particular sirup, with tumbler to receive the same, being brought in front of the operator or vender without hinderance or delay.

I claim—

1. The revolving wall D, corrugated to form adjoining recesses E, and combined with a stationary base, A, substantially as shown and described.

2. The wall D, having upright niches or recesses E E on its outer side, in combination with shelves *c* at the bottom of said niches, substantially as specified.

3. The wall D, having niches E, and forming cooling-chamber *h*, in combination with the jambs *d*, having doors C C, substantially as specified.

4. A rotating refrigerator provided with a central ice-well, the wall having a series of niches, in combination with jambs and doors which are supported on the revolving base *c*, that carries the refrigerator, substantially as herein shown and described.

5. The wall D, having adjoining upright niches and intervening cooling-spaces which extend to the inner cooling-chamber, substantially as herein shown and described.

JOHN MATTHEWS.

Witnesses:

DAVID WHITE,

FERD. STOCKDER.